F. WILLIAMS.
STUMP PULLER.
APPLICATION FILED DEC. 31, 1918.

1,404,253.

Patented Jan. 24, 1922.
2 SHEETS—SHEET 2.

INVENTOR
Fred Williams

BY
Richard J. Cook
ATTORNEYS

UNITED STATES PATENT OFFICE.

FRED WILLIAMS, OF BELLINGHAM, WASHINGTON, ASSIGNOR TO THE PERFECTO GEAR DIFFERENTIAL CO., OF SEATTLE, WASHINGTON, A CORPORATION.

STUMP PULLER.

1,404,253.

Specification of Letters Patent. Patented Jan. 24, 1922.

Application filed December 31, 1918. Serial No. 269,043.

*To all whom it may concern:*

Be it known that I, FRED WILLIAMS, a citizen of the United States, and a resident of Bellingham, in the county of Whatcom and State of Washington, have invented a new and useful Improvement in Stump Pullers, of which the following is a specification.

This invention relates to new and useful improvements in stump pullers and more particularly to power actuated stump pullers, and the object of this improvement is to provide a multiple application of gear reduction wherein a gear reducing mechanism is incorporated with the drive shaft, from whence power is communicated to a further gear reducing mechanism incorporated with the drum of the stump puller.

The invention consists in the novel construction, adaptation and combination of parts, as will be more fully described in the following specification, illustrated in the accompanying drawings, and finally pointed out in the appended claims.

In the drawings, Figure 1 is an elevation, in section, of the gear reducing mechanism in its assembled position.

Figure 1:
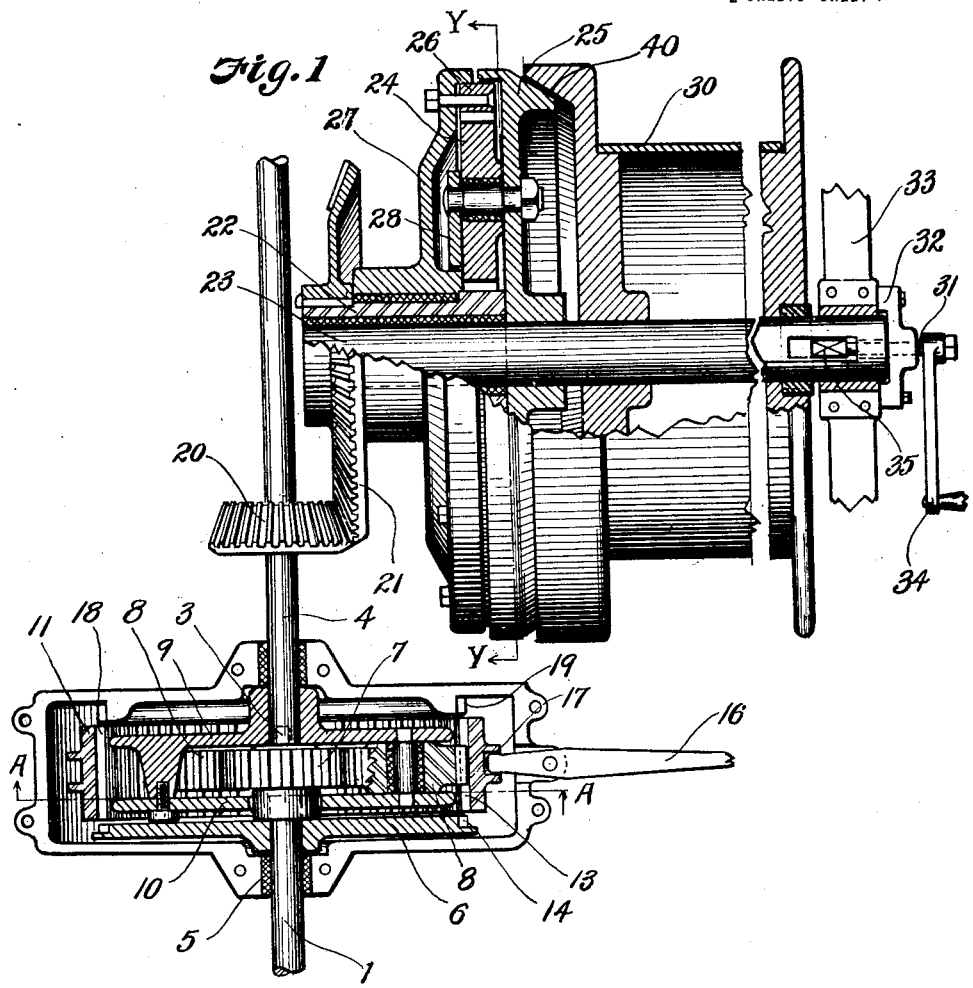
Figure 2:
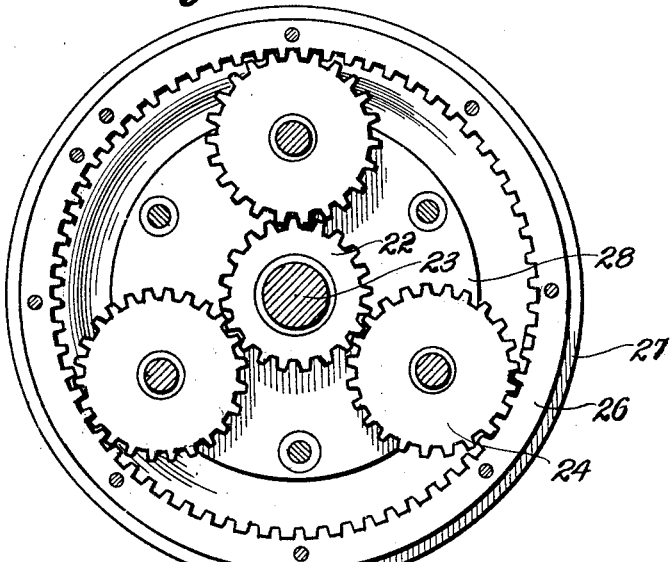
Figure 2 is a section taken along the line Y—Y of Figure 1.
Figure 3:
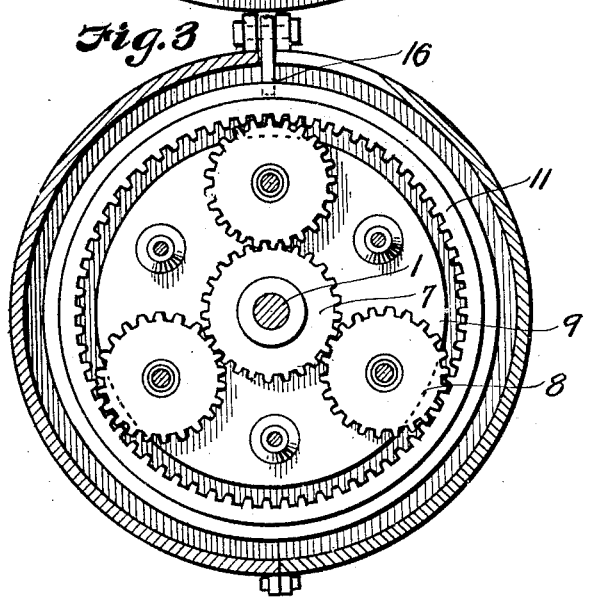
Figure 3 is a section taken along the line A—A of Figure 1.

Referring more particularly to the drawings, in which like reference numerals indicate like parts, the numeral 1 represents the drive shaft of the engine that terminates within a gear housing as at 3, that is provided around the drive shaft 1 and transmission shaft 4 upon suitable bearings 5. Within this housing is disposed the gear reduction mechanism, comprising a disk 6 that is keyed to the shaft 1 and alongside of this disk is a drive pinion 7 that is similarly secured to the shaft 1.

To the shaft 4 is keyed the spider 9, having rotatably mounted on the innerside thereof in spaced relation, a plurality of intermediate gears 8, the mounting of these gears being reinforced by disks 10, having a bearing with the hub of the pinion 7. Each of these intermediate gears are in meshing contact with a ring gear 11, which is placed concentric with the driving pinion 7, and this ring gear is adapted to be shifted laterally from the neutral position, as shown by a bifurcated lever 16, which engages a channelway 17 provided around the outer periphery of the ring gear.

When the ring gear is shifted to the left it is caused to engage disk 6 through the provision of lugs 13 provided in spaced relation circumferentially on the side thereof, that enter recesses 14 provided oppositely on the disk 6. With the ring gear locked in this position the intermediate gears 8 cease to rotate, and the spider 9 revolves at the same speed as the disk 6, consequently, rotating the transmission shaft 4 at the speed of the shaft 1. When the ring gear 11 is in its neutral position, as shown, it is free to rotate and hence no power is deliverable to the transmission shaft 4.

To shift the gears into low speed the ring gear 11 is caused to engage the housing 2 through correspondingly arranged lugs 18 and recesses 19, as employed to engage the disk 6. In this position the ring gear is held stationary and the intermediate gears 8 are actuated to travel around its periphery transmitting increased power at low speed through the spider 9 to the transmission shaft 4.

20 is a bevel gear keyed to the transmission shaft 4, which is in meshing contact at all times with the gear 21, keyed to the sleeve 22, and this sleeve in turn is rotatably mounted through suitable bearings upon the drum shaft 23. 25 is a spider which is keyed to the drum shaft 23 and has provided on the side thereof a plurality of rotatably mounted intermediate gears that are in mesh, respectively, with the geared portion of the sleeve 22 and with a ring gear 26, and this ring gear is fixedly secured to a disk 27, that engages the sleeve 22 through suitable bearings disposed intermediate the gear 21 and the intermediate gears 24. A disk 28 is herein shown as a means for reinforcing the mounting of the intermediate gears and has a bearing upon the shoulder of the disk 27.

30 is a drum that is journaled for rotation on the shaft 23, in suitable bearings, and is adapted to be shifted longitudinally in any well known manner. As herein shown, a threaded pin 31 is employed, which engages threads of a cap 32 through which it projects, the cap being secured to the frame 33. The unthreaded portion of this pin extends through a longitudinal slot provided in the end of shaft 23, where it is caused to abut a sliding key 35 provided in a slot in the shaft 23. This key being in bearing contact with the face of the drum, hence when pressure is exerted by the pin through the operation of the lever 34, the drum is moved into frictional contact with the disk 25, as at 40, through the provision of complemental shoulder extensions provided on both disk and drum.

It is obvious that various changes in the detail of construction can be resorted to within the scope of the appended claims.

What I claim as new and desire to protect by Letters Patent is:

1. A device of the class described comprising a drive, transmission and a drum shaft, a disk and a driving pinion fixedly attached to said drive shaft, a spider keyed to said transmission shaft, a ring gear, a plurality of intermediate gears rotatably mounted on said spider in meshing contact with said driving pinion and ring gear, means for locking said ring gear against rotary movement whereby low speed is transmitted through said intermediate gears to said transmission shaft, means for locking said ring gear to said disk whereby said transmission shaft is rotated at the speed of said drive shaft, a sleeve journaled for rotation on said drum shaft, means for rotating said sleeve off of said transmission shaft, a friction disk keyed to said drum shaft, a stationary disposed ring gear, a plurality of intermediate gears rotatably mounted on said friction disk in mesh with said sleeve and ring gear for imparting speed to said drum shaft, and a drum journaled for rotation on said drum shaft and adapted to be shifted longitudinally thereon to engage said friction disk to be rotatably actuated thereby.

2. A device of the class described, comprising a drive transmission and a drum shaft, a disk and a driving pinion keyed to said drive shaft, a spider keyed to said transmission shaft, a ring gear concentric with said pinion, a plurality of intermediate gears rotatably mounted circumferentially on the side of said spider in mesh with said pinion, means for shifting said ring gear to engage said disk and lock said intermediate gears against rotation thereby imparting the speed of said drive to said transmission shaft, means for holding said ring gear against rotation when shifted whereupon said intermediate gears will travel around the inner surface of said ring gear, imparting low speed to said transmission shaft, a sleeve journaled for rotation on said drum shaft, means for rotating said sleeve off of said transmission shaft, a ring gear fixedly disposed concentric with said sleeve, a friction disk keyed to said drum shaft and having rotatably provided circumferentially on the side thereof a plurality of intermediate gears that mesh respectively with the geared portion of said sleeve, and said last named ring gear, and a drum journaled for rotation on said driven shaft and adapted to be shifted longitudinally to engage said friction disk to be rotatably actuated thereby.

Signed by me at Seattle, Washington, this 21 day of Dec., 1918.

FRED WILLIAMS.

Witnesses:
E. B. HERALD,
ARTHUR F. BAKER.